US011029984B2

(12) United States Patent
Todd (10) Patent No.: US 11,029,984 B2
(45) Date of Patent: Jun. 8, 2021

(54) METHOD AND SYSTEM FOR MANAGING AND USING DATA CONFIDENCE IN A DECENTRALIZED COMPUTING PLATFORM

(71) Applicant: EMC IP Holding Company LLC, Hopkinton, MA (US)

(72) Inventor: Stephen James Todd, North Conway, NH (US)

(73) Assignee: EMC IP Holding Company LLC, Hopkinton, MA (US)

(*) Notice: Subject to any disclaimer, the term of this patent is extended or adjusted under 35 U.S.C. 154(b) by 108 days.

(21) Appl. No.: 16/396,646

(22) Filed: Apr. 27, 2019

(65) Prior Publication Data
US 2020/0341784 A1 Oct. 29, 2020

(51) Int. Cl.
G06F 9/455 (2018.01)
G06F 16/215 (2019.01)

(52) U.S. Cl.
CPC ........ G06F 9/45533 (2013.01); G06F 16/215 (2019.01)

(58) Field of Classification Search
CPC .......... G06F 16/24578; G06F 9/45533; G06F 16/215
See application file for complete search history.

(56) References Cited

U.S. PATENT DOCUMENTS

| 10,489,387 | B1 * | 11/2019 | Rogynskyy | ........... G06F 16/337 |
| 2014/0341476 | A1 * | 11/2014 | Kulick | .................... G06F 16/51 382/224 |
| 2015/0032609 | A1 * | 1/2015 | Abuelsaad | ........... G06Q 20/102 705/40 |
| 2017/0270122 | A1 * | 9/2017 | He | .................... G06F 16/24578 |
| 2018/0080793 | A1 * | 3/2018 | Kapicioglu | ........... H04W 4/021 |
| 2018/0082122 | A1 * | 3/2018 | Verdejo | .............. G06K 9/00771 |
| 2018/0150548 | A1 * | 5/2018 | Shah | .................... G06F 16/285 |
| 2019/0325642 | A1 * | 10/2019 | Martinet | .............. G06K 9/0063 |
| 2020/0184992 | A1 * | 6/2020 | Newell | ................... G06N 5/046 |

* cited by examiner

*Primary Examiner* — Dong U Kim
(74) *Attorney, Agent, or Firm* — Chamberlain, Hrdlicka, White, Williams & Aughtry (57) ABSTRACT

A method for managing data includes obtaining, by a virtual machine (VM) executing on a computing node, a data computation request from a client, and in response to the data computation request: sending a metadata request to a catalog node based on the computation request, obtaining a plurality of data set entries from the catalog node based on the metadata request, performing a confidence score analysis on the plurality of data set entries to obtain selected data set entries, initiating, on a local data system, a data computation using a local data set associated with at least one of the selected of data set entries, obtaining, in response to the initiating, a result from the local data system, and sending a data computation result to the client based on the data computation, wherein the data computation result is based on the result.

17 Claims, 8 Drawing Sheets

METHOD AND SYSTEM FOR MANAGING AND USING DATA CONFIDENCE IN A DECENTRALIZED COMPUTING PLATFORM

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage.

SUMMARY

In general, in one aspect, the invention relates to a method for managing data in accordance with one or more embodiments of the invention. The method includes obtaining, by a virtual machine (VM) executing on a computing node, a data computation request from a client, and in response to the data computation request: sending a metadata request to a catalog node based on the computation request, obtaining a plurality of data set entries from the catalog node based on the metadata request, performing a confidence score analysis on the plurality of data set entries to obtain selected data set entries, initiating, on a local data system, a data computation using a local data set associated with at least one of the selected of data set entries, obtaining, in response to the initiating, a result from the local data system, and sending a data computation result to the client based on the data computation, wherein the data computation result is based on the result.

In one aspect, a non-transitory computer readable medium in accordance with one or more embodiments of the invention includes computer readable program code, which when executed by a computer processor enables the computer processor to perform a method for managing data. The method includes obtaining, by a virtual machine (VM) executing on a computing node, a data computation request from a client, and in response to the data computation request: sending a metadata request to a catalog node based on the computation request, obtaining a plurality of data set entries from the catalog node based on the metadata request, performing a confidence score analysis on the plurality of data set entries to obtain selected data set entries, initiating, on a local data system, a data computation using a local data set associated with at least one of the selected of data set entries, obtaining, in response to the initiating, a result from the local data system, and sending a data computation result to the client based on the data computation, wherein the data computation result is based on the result.

In one aspect, a system in accordance with in one or more embodiments of the invention includes a processor and memory which includes instructions, which when executed by the processor, perform a method for managing data. The method includes obtaining, by a virtual machine (VM) executing on a computing node, a data computation request from a client, and in response to the data computation request: sending a metadata request to a catalog node based on the computation request, obtaining a plurality of data set entries from the catalog node based on the metadata request, performing a confidence score analysis on the plurality of data set entries to obtain selected data set entries, initiating, on a local data system, a data computation using a local data set associated with at least one of the selected of data set entries, obtaining, in response to the initiating, a result from the local data system, and sending a data computation result to the client based on the data computation, wherein the data computation result is based on the result.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for utilizing distributed data sets. The distributed data sets may be cleaned by local data systems, where the cleaning results in the generation of a confidence score for each data set. Embodiments of the invention may include utilizing the confidence scores, metadata associated with the data cleaning processes, and/or other information of data sets to determine whether to utilize the data sets to perform data computations. Embodiments of the invention may include generating a selection of data set entries associated with selected data sets, performing a data computation on the data sets and generating a data computation result based on the data computation.

Figure 1A:
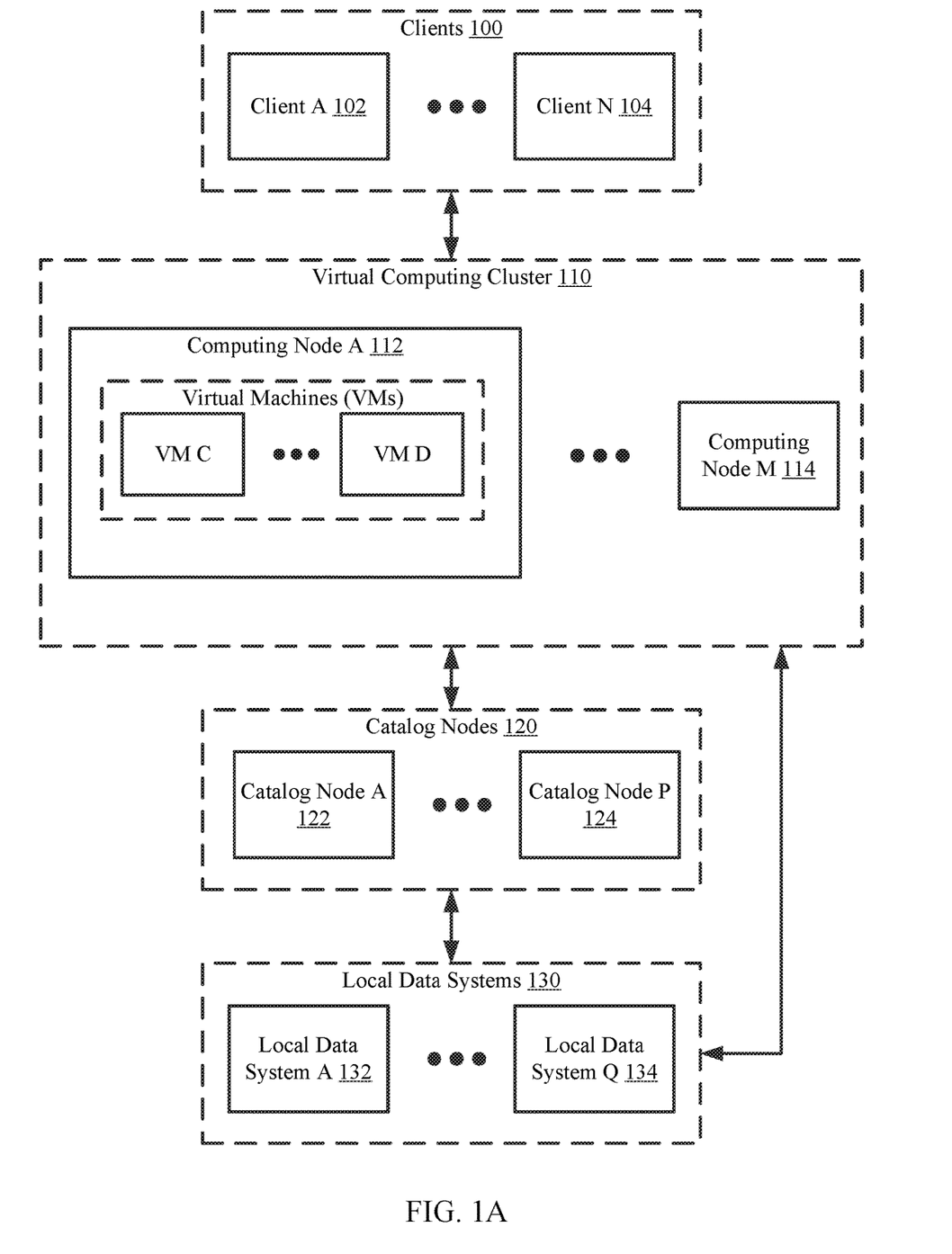
FIG. 1A shows a diagram of a system in accordance with one or more embodiments of the invention.

FIG. 1A shows a diagram of a system in accordance with one or more embodiments of the invention. The system includes clients (100), a virtual computing cluster (110), catalog nodes (120), and local data systems (130). Each component of the system may be operably connected via any combination of wired and/or wireless connections. Each component of the system illustrated in FIG. 1A is discussed below.

In one or more embodiments of the invention, the clients (100) utilize computing resources of the virtual computing cluster (110) to identify data sets that satisfy a confidence threshold(s). The clients (100) may send requests to one or more computing nodes (112, 114) to perform processing on the data sets that satisfy the confidence threshold. The clients may obtain a result of the processing from the computing nodes (112, 114).

Figure 4:
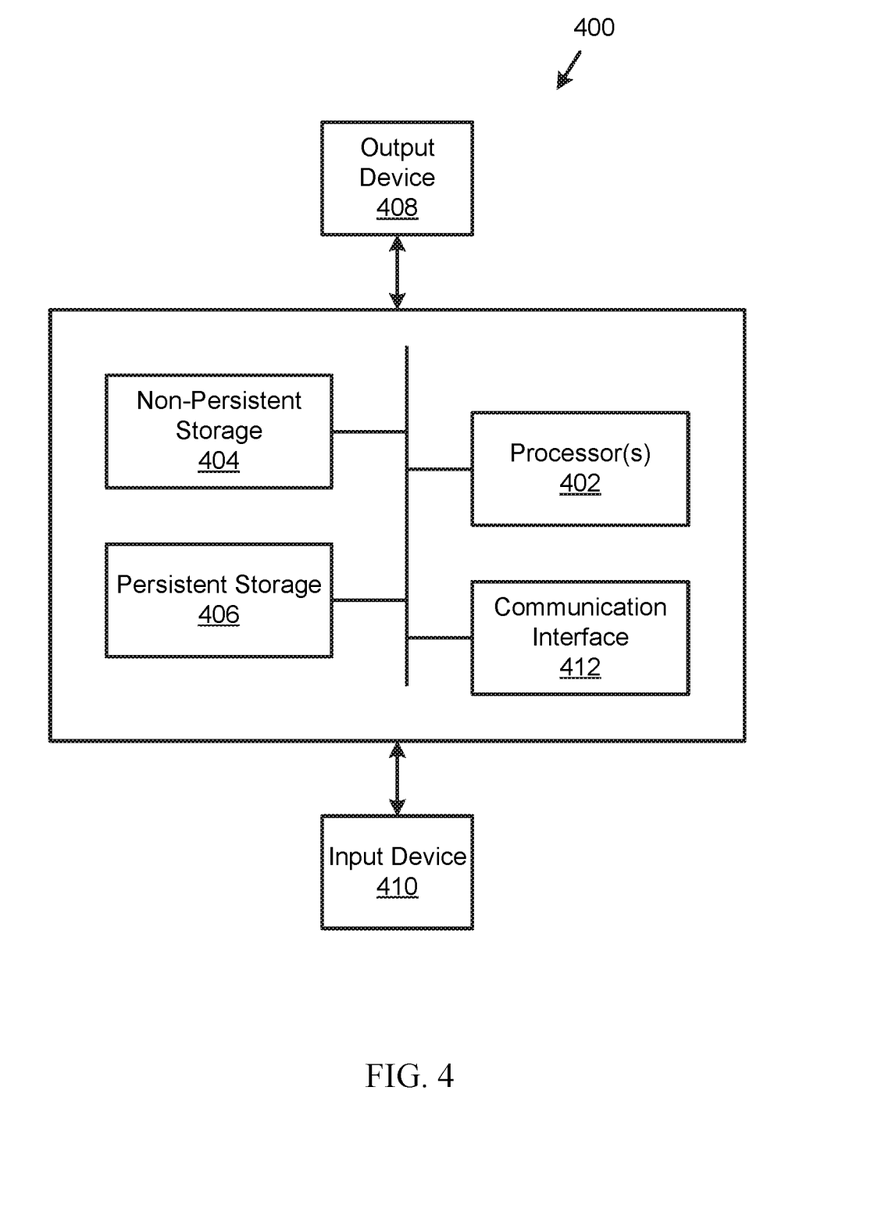
FIG. 4 shows a diagram of a computing device in accordance with one or more embodiments of the invention.

In one or more embodiments of the invention, each client (102, 104) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the client (102, 104) described throughout this application.

A client (102, 104) may be implemented as a logical device without departing from the invention. The logical device utilizes computing resources of any number of physical computing devices to provide the functionality of the client (102, 104) described throughout this application.

In one or more embodiments of the invention, the virtual computing cluster (110) may be implemented as a set of computing nodes (112, 114). The computing nodes (112, 114) may each host one or more virtual machines. The virtual machines (116) may be logical entities executed using computing resources (not shown) of the computing nodes (112, 114). Each of the virtual machines (116C, 116D) may be performing similar or different processes. In one or more embodiments of the invention, the virtual machines (116) provide services to users, e.g., clients (100). For example, the virtual machines (116) may host applications that may be used to process one or more data sets obtained from the local data systems (130). The virtual machines (116) may host other types of applications without departing from the invention.

Figure 2A:
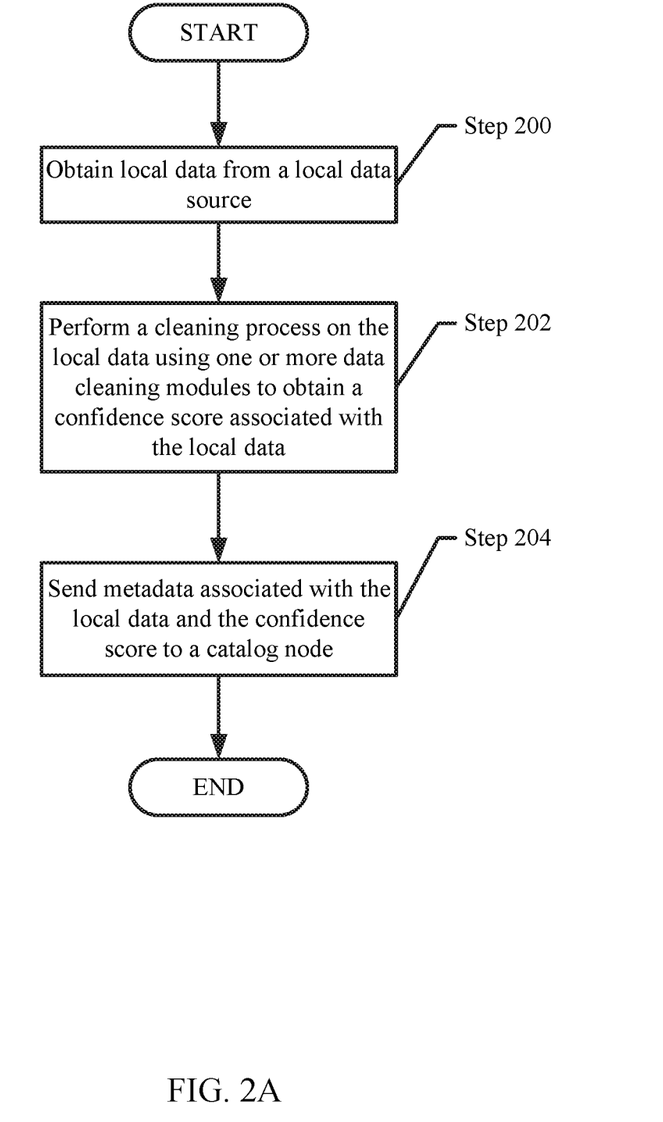
FIG. 2A shows a flowchart for processing data from a local data source in accordance with one or more embodiments of the invention.
Figure 2B:
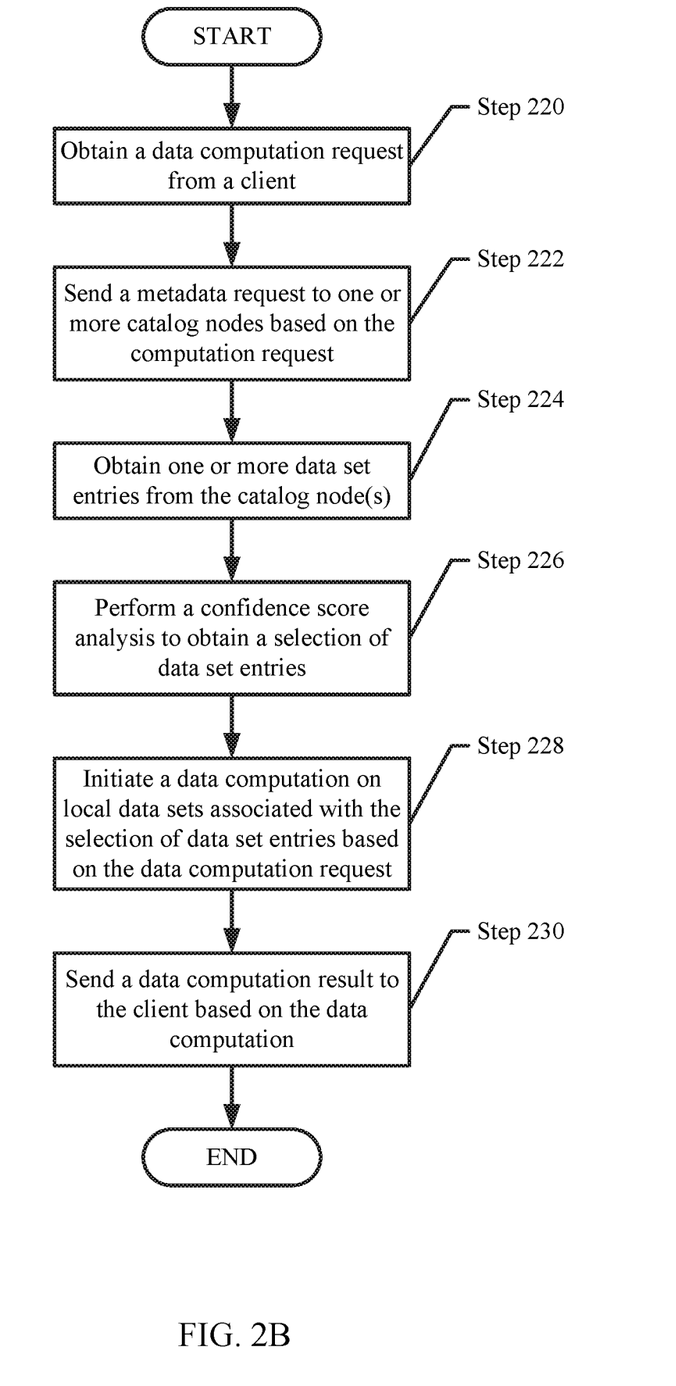
FIG. 2B shows a flowchart for processing computation requests in accordance with one or more embodiments of the invention.

In one or of embodiments of the invention, the virtual machines (116) are implemented as computer instructions, e.g., computer code, stored on a persistent storage (e.g., on a computing node (112)) that when executed by a processor(s) of the computing node (112) cause the computing node (112) to provide the functionality of the virtual machines (116) described throughout this application and/or all, or a portion thereof, of the method illustrated in FIG. 2B.

In one or more embodiments of the invention, each computing node 112, 114) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the computing node (112, 114) described throughout this application.

In one or more embodiments of the invention, the catalog nodes (120) store information (e.g., metadata) about data stored in the local data systems (130). The catalog nodes (120) may provide information about the stored data to the computing nodes (112, 114). For additional details regarding a catalog nodes, see, e.g., FIG. 1C.

In one or more embodiments of the invention, each catalog node (122, 124) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the catalog node (122, 124) described throughout this application.

A catalog node (122, 124) may be implemented as a logical device without departing from the invention. The logical device utilizes computing resources of any number of physical computing devices to provide the functionality of the catalog node (122, 124) described throughout this application.

In one or more embodiments of the invention, the local data systems (130) are systems that obtain data, store data, and/or execute applications based on the stored data. The local data systems (130) may provide results of the stored data from executed applications to the virtual computing cluster (110).

In one or more embodiments of the invention, the local data systems (130) may generate metadata to be stored by the catalog nodes (120). The metadata may specify the data stored in the local data systems (130) and/or additional information about the data.

In one or more embodiments of the invention, each local data system (130) is implemented as a system of computing devices (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the local data system (130) described throughout this application and/or all, or a portion, of the method illustrated in FIG. 2A.

A local data system (132, 134) may be implemented as a logical device without departing from the invention. The logical device utilizes computing resources of any number of physical computing devices to provide the functionality of the local data system (132, 134) described throughout this application and/or all, or a portion, of the method illustrated in FIG. 2A. For additional details regarding a local data system (132, 134), see, e.g., FIG. 1B.

Figure 1B:
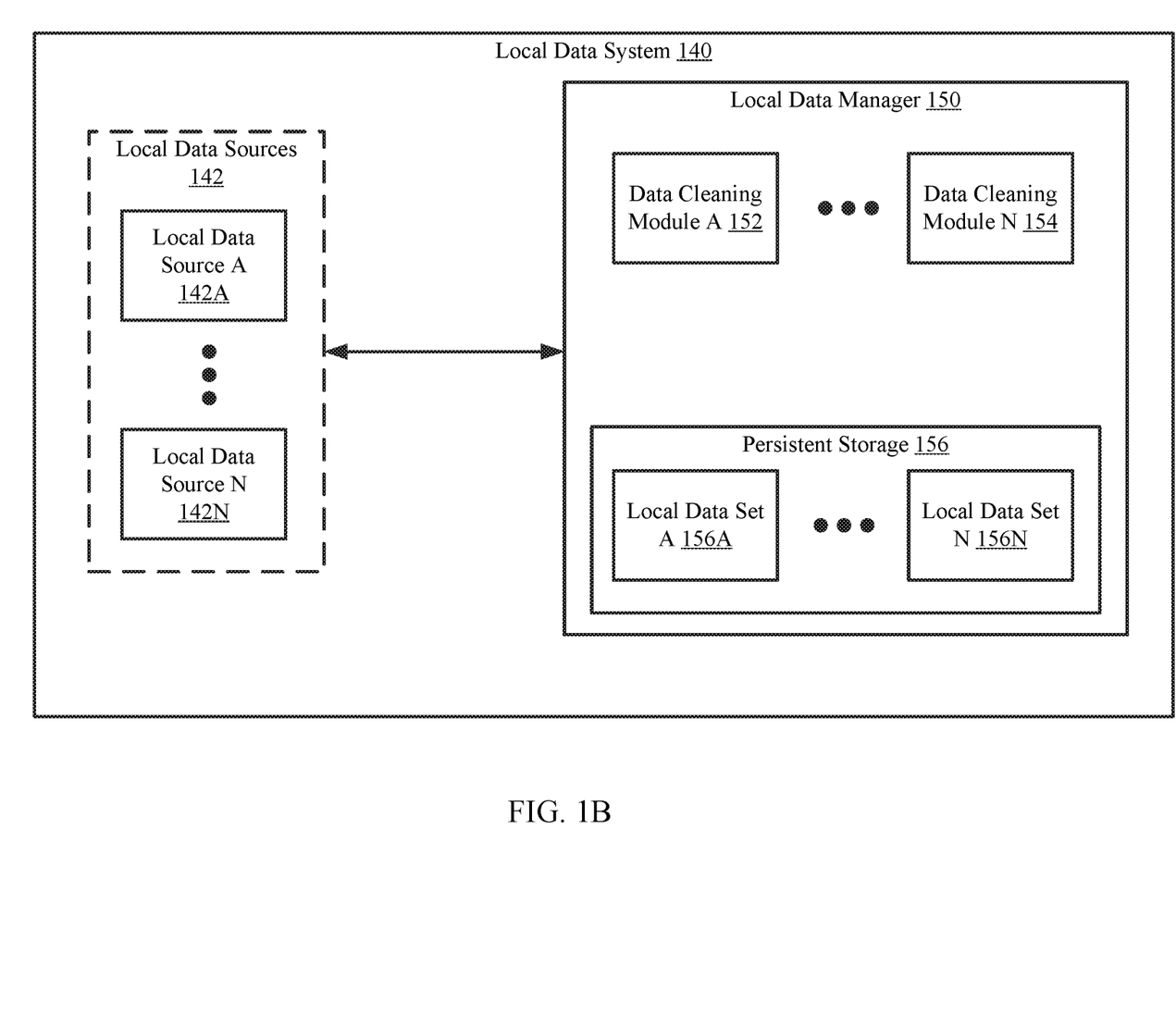
FIG. 1B shows a diagram of a local data system in accordance with one or more embodiments of the invention.

FIG. 1B shows a diagram of a local data system in accordance with one or more embodiments of the invention. The local data system (140) may be similar to a local data system (112, 114) discussed above with respect to FIG. 1A. As discussed above, the local data system may obtain data, store data, and execute applications. To perform the aforementioned functionality, the local data system (140) includes local data sources (142) and a local data manager (150). The local data sources (142) and the local data manager (150) may be operably connected via any combination of wired and/or wireless networks without departing from the invention. The local data system (140) may include additional, fewer, and/or different components without departing from the invention. Each of the aforementioned components is discussed below.

In one or more embodiments of the invention, the local data sources (142) are sources of data obtained from a real-world process. A data source may be, for example, a sensor. The sensor may be a hardware device for supplying data regarding a real-world process. For example, the sensor may be a count sensor that determines the number of items that are present in a particular location. The count sensor may supply the number of items to a database that stores the information on behalf of the count sensor. The sensor may be other types of sensors (e.g., distance sensors, temperature sensors, cameras, audio sensors, etc.) without departing from the invention.

In one or more embodiments of the invention, at least one of the local data sources (142A, 142N) is an Internet of things (IOT) device. For example, one of the local data sources (142A) may be a camera operably connected to the Internet and that supplies data via an IOT standard to the local data manager (150). The data may be a video stream of a particular location. Image recognition may be utilized to extract relevant information from the video stream. The relevant information may be supplied to the local data manager (150) in isolation or in combination with the video stream itself. The invention is not limited to the aforementioned examples.

In one or more embodiments of the invention, the local data manager (150) is a device that manages data obtained from the local data sources (142). The local data manager (150) may manage the data by storing the data in persistent storage (156) and/or providing the data to external entities (e.g., computing nodes). The local data manager (150) may include one or more data cleaning modules (152, 154), and persistent storage (156). The local data manager may include additional, fewer, and/or different components without departing from the invention.

In one or more embodiments of the invention, a data cleaning module (152, 154) is an application that processes data stored in the persistent storage (156) to obtain a confidence score of the data. The data may be, for example, a local data set (156A, 156N).

In one or more embodiments of the invention, a confidence score is a numerical representation, e.g., a percentage, of a quality of a local data set (156A, 156N). A high confidence score may represent a local data set with a high quality. Conversely, a low confidence score may represent a local data set with a low quality. The quality of a local data set may reflect a usefulness of the local data set when executing an algorithm on the local data set. Said another way, the quality of the data set may reflect how much a client may rely on this data within the data set. If the data is high quality, then the results generated using the data set may be considered to be more accurate and/or reliable when compared with results generated using data that is determined to be of lower quality (quantified by the confidence score).

Continuing with the discussion of FIG. 1B, a data cleaning module (152, 154) may process a local data set (156A, 156N) by identifying one or more characteristics about the local data set and calculating a confidence score based on the characteristics. Different data cleaning modules may use different characteristics of the data and/or apply different types of analysis on the characteristics in order to generate a confidence score. The characteristics that a data cleaning module (152, 154) uses may be based on the data cleaning module (152, 154). Examples of characteristics may include, but are not limited to, accuracy of the values of the local data sets (156A, 156N), the local data source (142A, 142N) from which the local data sets are obtained, an age of the local data set (i.e., a period of time in which the local data set was obtained), the completeness of the local data sets, the consistency of the data within the local data set, and/or other characteristics without departing from the invention.

The data cleaning module may calculate the confidence score based on any combination of the characteristics without departing from the invention.

For example, a data cleaning module (e.g., 152) may obtain characteristics of a local data set (e.g., 156A) that specify a range of data points of the local data set. The local data set (156A) may be, for example, a series of temperature readings obtained from a digital thermometer. The data cleaning module (152) may calculate a confidence score based on whether the values of the temperature readings are within a predetermined range of values. If a significant number of the temperature readings are out of the predetermined range, the data cleaning module may calculate a lower confidence score than a local data set where the values are within the predetermined range. As a second example, a data cleaning module (e.g., 154) may use the age of the local data set (e.g., 156A) to calculate a confidence score. The data cleaning module (154) may calculate a low confidence score on the local data set (156A) if a timestamp associated with the local data set (156A) specifies a point in time that is outside of a predetermined time period (e.g., prior to the past 10 years). The invention is not limited to the aforementioned examples.

In one or more embodiments of the invention, a data cleaning module (152, 154) is a hardware device including circuitry. The data cleaning module (152, 154) may be, for example, a digital signal processor, a field programmable gate array, or an application specific integrated circuit. The data cleaning module (152, 154) may be other types of hardware devices without departing from the invention.

In one or more embodiments of the invention, a data cleaning module (152, 154) is implemented as computing code stored on a persistent storage (e.g., 156) that when executed by a processor of the local data manager (150) performs the functionality of the data cleaning module (152, 154). The processor may be a hardware processor including circuitry such as, for example, a central processing unit or a microcontroller. The processor may be other types of hardware devices for processing digital information without departing from the invention.

The persistent storage (156) may be configured to store data. The data may be, for example, local data sets (156A, 156N). The persistent storage (156) may be persistent storage. For example, the persistent storage (156) may include hard disk drives, solid state drives, and/or tape drives for storing data. The persistent storage (156) may include other types of non-transitory storage mediums without departing from the invention. The data stored in the persistent storage (156) may be accessed by the external entities.

In one or more embodiments of the invention, the local data manager (150) includes functionality for executing local computation requests obtained from the external entities. The local computation requests may specify processing one or more local data sets (156A, 156N) to generate a result. The result may be sent to the external entities. See e.g., FIG. 2B.

In one or more embodiments of the invention, the local data manager (150) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the local data manager (150) described throughout this application and/or all, or portion, of the method illustrated in FIGS. 2A-2B.

The local data manager (150) may be implemented as a logical device without departing from the invention. The logical device utilizes computing resources of any number of physical computing devices to provide the functionality of the local data manager (150) described throughout this application and/or all, or a portion, of the method illustrated in FIGS. 2A-2B.

Figure 1C:
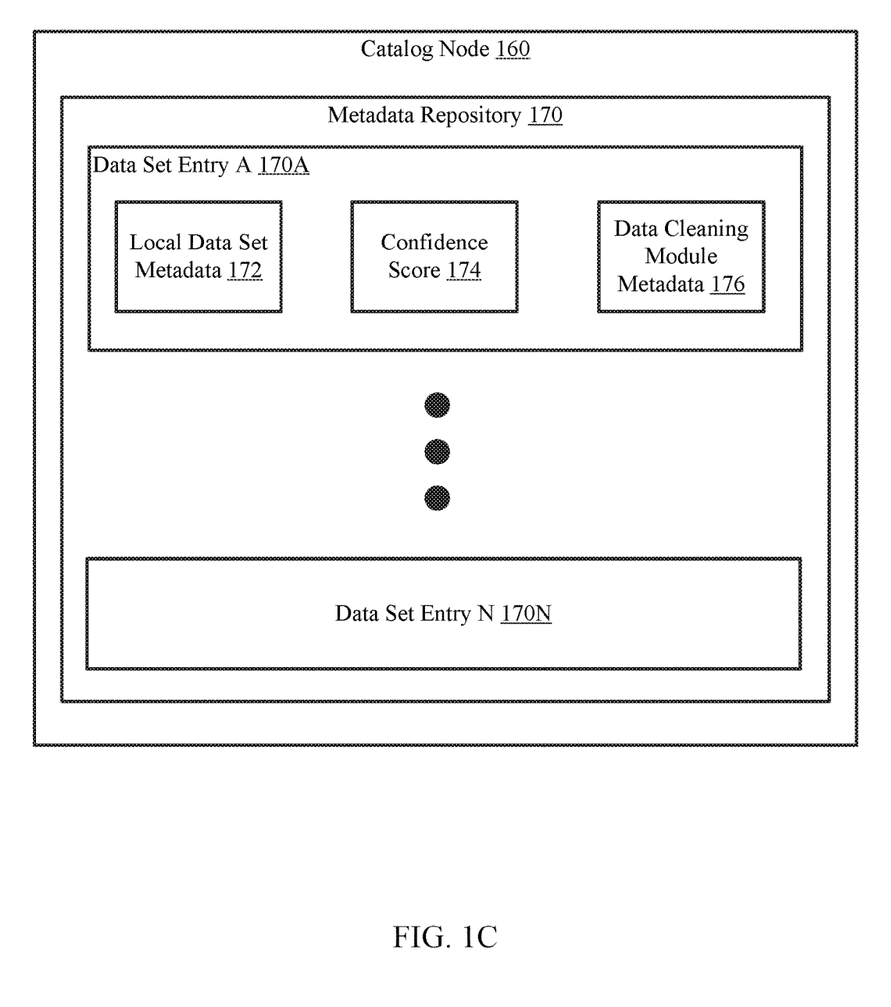
FIG. 1C shows a diagram of a catalog node in accordance with one or more embodiments of the invention.

FIG. 1C shows a diagram of a catalog node in accordance with one or more embodiments of the invention. The catalog node (160) may be similar to a catalog node (122, 124, FIG. 1) discussed above. The catalog node (160) may include a metadata repository (170). The catalog node (160) may include additional, fewer, and/or different components without departing from the invention.

In one or more embodiments of the invention, the metadata repository (170) includes a number of data set entries (170A, 170N). Each data set entry (170A, 170N) may include local data set metadata (172), a confidence score (174), and data cleaning module metadata (176). Each data set entry (170A, 170N) may include additional, fewer, and/or different data structures without departing from the invention. Each data structure illustrated for a data set entry (170A) is discussed below.

In one or more embodiments of the invention, local data set metadata (172) is a data structure that specifies information about a local data set. Information of a local data set may include, for example, a geographical location in which the local data was generated, a type of local data source (e.g., a type of sensor) used to generate the local data set, a local data manager storing the local data set, etc. The local data set metadata (172) may include other types of information associated with a local data set without departing from the invention.

In one or more embodiments of the invention, the confidence score (174) specifies a confidence score calculated by a data cleaning module applied on the local data set specified in the local data set metadata (172). In one or more embodiments of the invention, the confidence score (174) is a combination of confidence scores obtained from one or more data cleaning modules applied to the local data set.

In one or more embodiments of the invention, the data cleaning module metadata (176) is a data structure that specifies one or more data cleaning modules used to calculate the confidence score (174). The data cleaning module metadata (176) may include additional information about the data cleaning module(s). The additional information may include, for example, a local data manager executing the data cleaning module(s).

In one embodiment of the invention, if the local data manager includes multiple data cleaning modules, then the data obtained from the local data source may be processed by the different cleaning modules. In this scenario, the result of processing the data from the local data source using different cleaning modules results in multiple data set entries—one for each of the different data cleaning modules that was applied.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for processing data from a local data source in accordance with one or more embodiments of the invention. The method shown in FIG. 2A may be performed by, for example, a local data system (132, 134, FIG. 1A). Other components of the system illustrated in FIG. 1A may perform the method of FIG. 2A without departing from the invention.

Turning to FIG. 2A, in step 200, local data is obtained from a local data source. In one or more embodiments of the invention, the local data is one or more local data sets.

In step 202, a cleaning process is performed on the local data using one or more data cleaning modules to obtain a confidence score associated with the local data. In one or more embodiments of the invention, the data cleaning module(s) perform the data cleaning by identifying characteristics of the local data and making determinations of the local data based on the characteristics. The confidence score may be a combination of one or more confidence scores generated by each of the data cleaning module(s).

In step 204, metadata associated with the local data and the confidence score is sent to a catalog node(s). The metadata may include local data set metadata and/or data cleaning module metadata. The metadata and confidence score sent to the catalog node(s) may be used to generate an entry of a metadata repository stored by the catalog node. In one embodiment of the invention, the metadata and confidence score may be sent to multiple catalog nodes. In this scenario, each of the catalog nodes includes all of the data set entries; said another way, the catalog nodes are mirrored. By mirroring the catalog nodes, the compute nodes may distribute their requests across the catalog nodes to minimize latency associated with obtaining the data set entries (see e.g., FIG. 2B below).

FIG. 2B shows a flowchart for processing computation requests in accordance with one or more embodiments of the invention. The method shown in FIG. 2B may be performed by, for example, a local data manager (150, FIG. 1B). Other components of the system illustrated in FIG. 1B or FIG. 1A may perform the method of FIG. 2B without departing from the invention.

In step 220, a data computation request is obtained from a client. The data computation request may specify an application, algorithm, training model, or other data computation to be performed on one or more local data sets to obtain a result. The data computation request may specify types of data to be used when executing the data computation. For example, a computing request that specifies a training model of images may specify a type of data to be images.

In one or more embodiments of the invention, the data computation request specifies a confidence threshold. In one or more embodiments of the invention, the confidence threshold is a value or range of values that a confidence score should satisfy in order to be used to service the data computation request.

In step 222, a metadata request is sent to one or more catalog nodes based on the data computation request. The metadata request may specify one or more local data sets as specified by the data computation request. The metadata request may specify, for example, a type of data.

In one or more embodiments of the invention, the catalog node identifies one or more data set entries of a metadata repository that satisfy the metadata request.

In step 224, one or more data set entries are obtained from the catalog node(s). The data set entries may each specify a local data set, a confidence score associated with the local data set, and/or data cleaning module(s) used to calculate the confidence score.

In step 226, a confidence score analysis is performed on the data sets to obtain a selection of data set entries. In one or more embodiments of the invention, the confidence score analysis includes determining whether a confidence score associated with each local data set satisfies a confidence threshold specified by the data computation request. The confidence score analysis may include selecting data set entries with confidence scores that satisfy the confidence threshold. In one embodiment of the invention, the analysis in step 226 is performed on the computing node.

In another embodiment of the invention, the confidence score analysis includes providing the data set entries to the client to be reviewed by a user via the client. The users may use any combination of the local data set metadata, the confidence scores, and/or the data cleaning module metadata of each data set entry to generate a selection of data set entries.

In step 228, a data computation is initiated on local data sets associated with the selected of data set entries based on the data computation request. In one or more embodiments of the invention, the data computation is initiated by identifying one or more local data sets associated with the selected data set entries, identifying local data systems that store the local data sets, and sending local computation requests to the identified local data systems. The local computation requests may specify the data computation of the data computation request obtained in step 220. A local computation request sent to a local data system may specify one or more local data sets on which to perform the data computation as well as the specific type of processing to performing (e.g., what algorithms to apply to the local data sets).

In one embodiment of the invention, the local computation request specifies an identifier for an algorithm or application that is currently present on the local data system, where the algorithm or application is to be used to process the selected local data set. In another embodiment of the invention, the local computation request may include the algorithm or application (e.g., in the form of executable code) that is to be executed by the local data system to process the selected local data set.

In one or more embodiments of the invention, the local data systems may service the local computation request and each generates a result. The results may be sent to the compute node. The compute node (or a virtual machine executing thereon) may obtain results from the same local data system or multiple local data systems, and combine the obtained results to generate a data computation result. The data computation result may represent a collective result of applying the data computation to data associated with the selection of data set entries.

In step 230, the data computation result is sent to the client based on the data computation. In one or more embodiments of the invention, the client may also receive additional information associated with the data computation result. The additional information may include, but is not limited to: (i) local data set metadata associated with the data used to generate the data computation result, (ii) confidence scores associated with the data, and/or (iii) the data cleaning module metadata used to calculate the confidence scores. In this manner, the client may be provided with sufficient information to evaluate the quality with which the data computation result was generated.

EXAMPLE

Figure 3A:
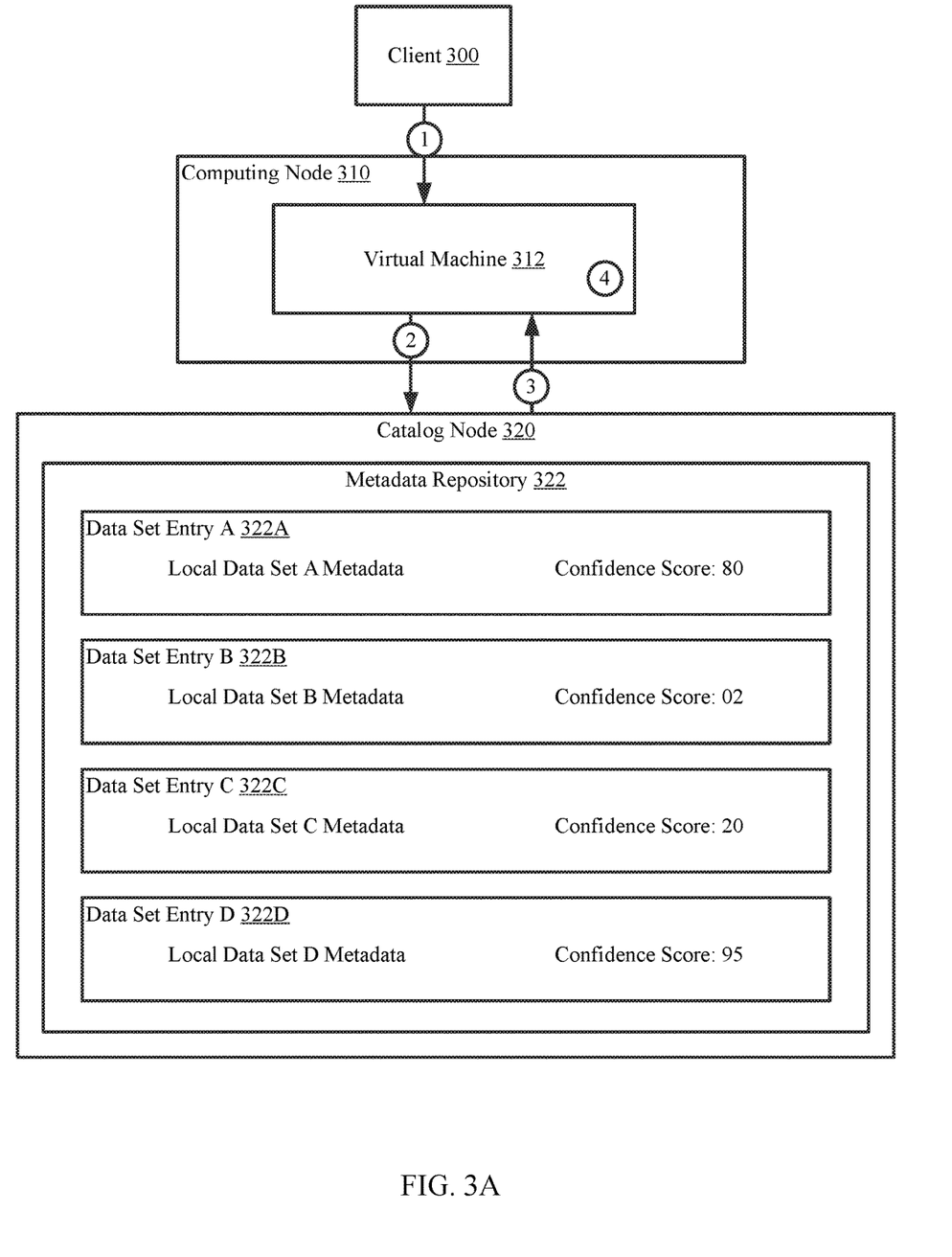
FIGS. 3A-3B show an example in accordance with one or more embodiments of the invention.
Figure 3B:
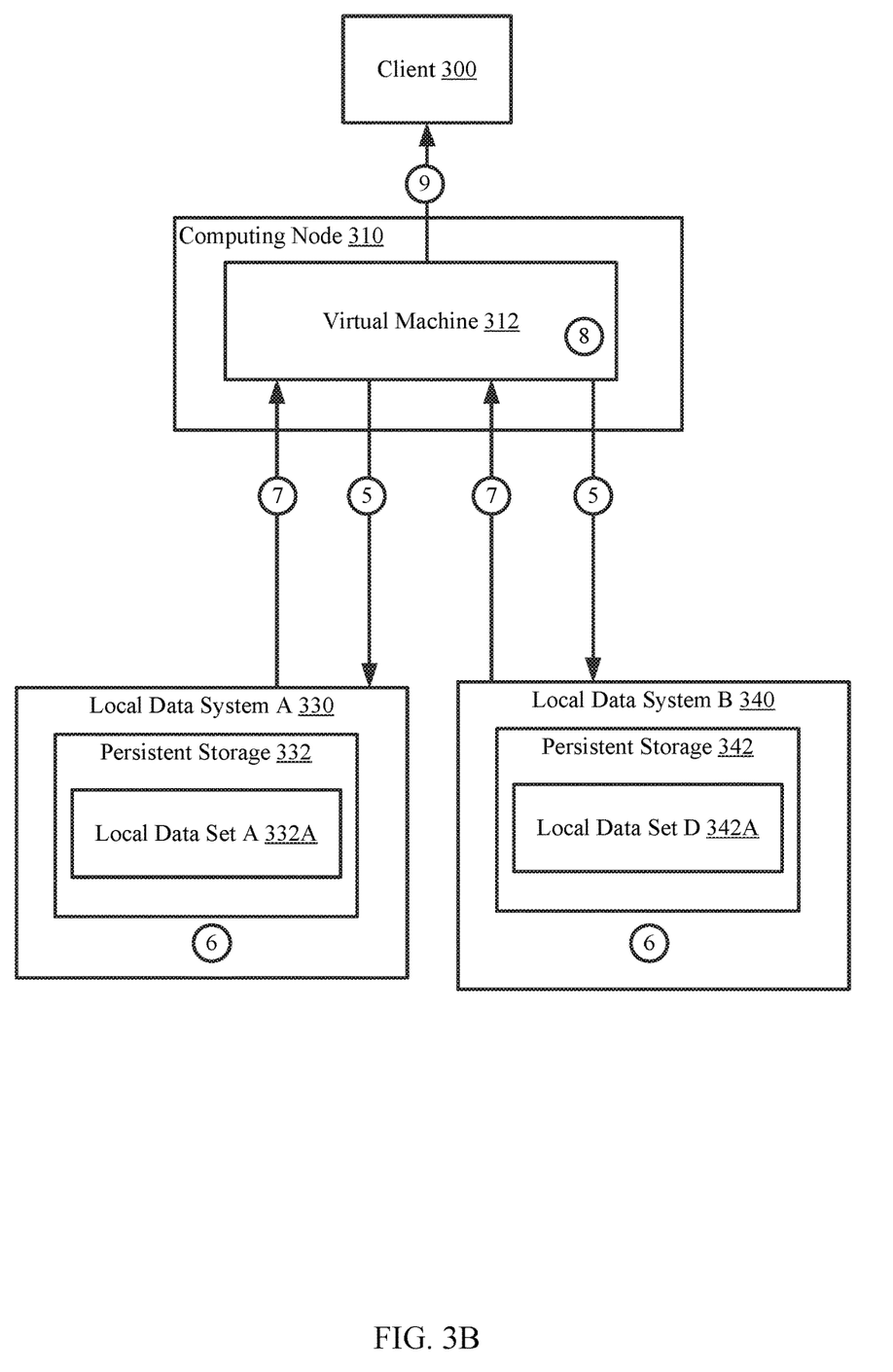

The following section describes an example. The example, illustrated in FIGS. 3A-3B, is not intended to limit the invention. Turning to the example, consider a scenario in which a client would like to implement an algorithm on data from one or more local data systems. The data may be data obtained by digital thermometers from any geographical location.

FIG. 3A shows a diagram of an example system in accordance with one or more embodiments of the invention. The example system includes a client (300) that sends a data computation request to a virtual machine (312) hosted by a computing node (310) [1]. The data computation request may specify a temperature prediction algorithm to be implemented on temperature readings of local data sets. The data computation may specify a confidence threshold of 70 for local data sets.

The virtual machine (VM) may send a metadata request to a catalog node (320) of the example system [2]. The catalog node (320) may identify, using a metadata repository (322), local data sets associated with the metadata request. The catalog node (320) may send the identified data set entries (322A, 322B, 322C, 322D) to the VM (312) [3].

The VM (312) may perform a confidence score analysis on the obtained data set entries to identify local data sets each associated with a confidence score that satisfies the confidence threshold [4]. Based on the confidence score analysis, the VM (312) may determine that local data sets A and D satisfy the confidence threshold.

FIG. 3B shows a diagram of the example system with the computing node (310) sending local computation requests to each local data system (330, 340) [5]. Each local computation request may specify the temperature prediction algorithm to be performed on a local data set. Specifically, the local computation request sent to local data system A (330) specifies executing the temperature prediction algorithm on local data set A (332A); the local computation request sent to local data system B (340) specifies executing the temperature prediction algorithm on local data set D (342A).

Each local data system (330, 340) may execute the temperature prediction algorithm on the respective data sets (332A, 342A) [6]. The results of the execution may be sent to the VM (312) [7]. The VM (312) may combine each obtained result to generate a data computation result [8]. A response that includes the data computation result may be sent to the client (300) [9]. The response may further include metadata that specifies (i) the local data sets (332A, 342A) used to generate the data computation result, (ii) the confidence score of each local data set (332A, 342A), and/or (iii)

data cleaning module(s) used to calculate the confidence scores of each local data set (332A, 342A).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments may improve the operation of one or more computing devices by providing information about data quality (in the form of confidence scores) to a compute node and/or a client. The information about the data quality may then be used to ensure that data with an appropriate quality level is used to perform computations. When the data with an appropriate quality level is used to perform computations, the results of the computation may be more accurate.

Thus, embodiments of the invention may address the problem of using varying quality levels of data for performing computations. This problem arises due to the technological nature of the distributed environment in which data is processed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data in a local data system, the method comprising:
   performing, by a cleaning module, a cleaning process on a local data set to generate a confidence score corresponding to the local data set, wherein the local data system comprises a local data manager, a local data source, and the cleaning module, wherein the local data set is stored on the local data system;
   sending, by the cleaning module, a data set entry to a catalog node, wherein the data set entry comprises the confidence score, local data set metadata, and cleaning module metadata,
       wherein the local data set metadata comprises at least one of: a geographical location of the local data source, a type of the local data source, and the local data manager;
   obtaining, by a virtual machine (VM) executing on a computing node, a data computation request from a client;
   in response to the data computation request:
       sending a metadata request to the catalog node based on the data computation request;
       obtaining a plurality of data set entries from the catalog node based on the metadata request, wherein the plurality of data set entries comprises at least the data set entry;
       performing a confidence score analysis on the plurality of data set entries to obtain selected data set entries, wherein the selected data set entries comprise at least the data set entry;
       initiating, on the local data system, a data computation using the local data set;
       obtaining, in response to the initiating, a result from the local data system; and
       sending a data computation result to the client based on the data computation, wherein the data computation result is based on the result.

2. The method of claim 1, wherein the cleaning module metadata specifies the data cleaning module.

3. The method of claim 1, wherein performing the confidence score analysis comprises:
   identifying the confidence score from the data set entry of the plurality of data set entries;
   making a determination that the confidence score satisfies a confidence threshold; and
   selecting the data set entry as one of the selected data set entries based on the determination.

4. The method of claim 1, wherein initiating the data computation on the local data set comprises sending a local computation request to the local data system, wherein the local computation request specifies the data computation to be performed on the local data set.

5. The method of claim 4, wherein the local data set is stored in the local data system.

6. The method of claim 1, wherein the local data source is an internet of things (IoT) device.

7. A non-transitory computer readable medium comprising computer readable program code, which when executed by a computer processor enables the computer processor to perform a method, the method comprising:

performing, by a cleaning module, a cleaning process on a local data set to generate a confidence score corresponding to the local data set, wherein a local data system comprises a local data manager, a local data source, and the cleaning module, wherein the local data set is stored on the local data system;

sending, by the cleaning module, a data set entry to a catalog node, wherein the data set entry comprises the confidence score, local data set metadata, and cleaning module metadata, wherein the local data set metadata comprises at least one of: a geographical location of the local data source, a type of the local data source, and the local data manager;

obtaining, by a virtual machine (VM) executing on a computing node, a data computation request from a client;

in response to the data computation request:
sending a metadata request to the catalog node based on the data computation request;
obtaining a plurality of data set entries from the catalog node based on the metadata request, wherein the plurality of data set entries comprises at least the data set entry;
performing a confidence score analysis on the plurality of data set entries to obtain selected data set entries, wherein the selected data set entries comprise at least the data set entry;
initiating, on the local data system, a data computation using the local data set;
obtaining, in response to the initiating, a result from the local data system; and
sending a data computation result to the client based on the data computation, wherein the data computation result is based on the result.

8. The non-transitory computer readable medium of claim 7, wherein the cleaning module metadata specifies the cleaning module.

9. The non-transitory computer readable medium of claim 7, wherein performing the confidence score analysis comprises:
identifying the confidence score from the data set entry of the plurality of data set entries;
making a determination that the confidence score satisfies a confidence threshold; and
selecting the data set entry as one of the selected data set entries based on the determination.

10. The non-transitory computer readable medium of claim 7, wherein initiating the data computation on the local data set comprises sending a local computation request to the local data system, wherein the local computation request specifies the data computation to be performed on the local data set.

11. The non-transitory computer readable medium of claim 10, wherein the local data set is stored in the local data system.

12. The non-transitory computer readable medium of claim 7, wherein the local data source is an internet of things (IoT) device.

13. A system, comprising:
a processor; and
memory comprising instructions, which when executed by the processor, perform a method, the method comprising:
performing, by a cleaning module, a cleaning process on a local data set to generate a confidence score corresponding to the local data set, wherein a local data system comprises a local data manager, a local data source, and the cleaning module, wherein the local data set is stored on the local data system;
sending, by the cleaning module, a data set entry to a catalog node, wherein the data set entry comprises the confidence score, local data set metadata, and cleaning module metadata,
wherein the local data set metadata comprises at least one of: a geographical location of the local data source, a type of the local data source, and the local data manager;
obtaining, by a virtual machine (VM) executing on a computing node, a data computation request from a client;
in response to the data computation request:
sending a metadata request to the catalog node based on the computation request;
obtaining a plurality of data set entries from the catalog node based on the metadata request, wherein the plurality of data set entries comprises at least the data set entry;
performing a confidence score analysis on the plurality of data set entries to obtain selected data set entries, wherein the selected data set entries comprise at least the data set entry;
initiating, on the local data system, a data computation using the local data set;
obtaining, in response to the initiating, a result from the local data system; and
sending a data computation result to the client based on the data computation, wherein the data computation result is based on the result.

14. The system of claim 13, wherein performing the confidence score analysis comprises:
identifying the confidence score from the data set entry of the plurality of data set entries;
making a determination that the confidence score satisfies a confidence threshold; and
selecting the data set entry as one of the selected data set entries based on the determination.

15. The system of claim 13, wherein initiating the data computation on the local data set comprises sending a local computation request to the local data system, wherein the local computation request specifies the data computation to be performed on the local data set.

16. The system of claim 15, wherein the local data set is stored in the local data system.

17. The system of claim 13, wherein the local data source is an internet of things (IoT) device.

* * * * *